3,179,609
FINISH REMOVAL FORMULATION
Charles R. W. Morison, Glenshaw, Pa., assignor to Union Carbide Corporation, a corporation of New York
No Drawing. Filed Sept. 25, 1958, Ser. No. 763,165
6 Claims. (Cl. 260—28)

This invention relates to compositions or formulations used for the removal of coatings and finishes.

Among the earliest types of surface coatings can be listed the natural resins obtained as exudations from trees and shrubs. By today's standard these coatings generally were of inferior quality since they "crazed," chipped, became soft and powdery, and consequently, such coatings had to be frequently removed or covered. To preserve the aesthetic appearance of the object, removal of the deteriorated coating or finish was preferred rather than merely applying new coatings over the deteriorated portions. At first, only common solvents and alkalis such as caustic soda and potash, soda ash, mineral spirits, turpentine, and benzene were available as finish removal agents. These solvents and alkalis were of limited use depending upon the coating or finsh to be removed, the substrate, the position of the coated surface, i.e., whether inclined or horizontal, and the like. For example, alkalis often caused etching and discoloration on wood substrates.

With the passage of time, other coatings and finishes became available thereby increasing the problem of surface coatings removal. At the present time, in addition to the original shellacs, varnishes, natural resins and gums, there exists a variety of coating formulations such as lacquers from nitrocellulose, cellulose ethers and cellulose esters; synthetics such as vinyl-type resins and acrylics; linseed oil paints; alkyd resins; and others. Correspondingly, with the increase in commercial availability of a wide number of organic solvents, it is to be expected that the number of possible paint-removing chemicals has also increased.

It is generally accepted that the basic ingredients in a formulation useful for the removal of coating materials such as paint, varnish, lacquer, gums, resins, shellacs, rubber, and the like usually comprise (a) an active organic solvent, including binary, tertiary, etc., mixtures thereof, (b) a viscosity thickener, and (c) an evaporation retardant or film-forming compound. Commercial removal formulations also may include one or more of the following ingredients such as activator, emulsifying agent, water, wetting agent and the like. The function of the active organic solvent is to loosen the surface coating or film, whereas the primary purpose of the evaporation retardant or film-forming compound is to repress evaporation of the solvent until it has had an opportunity to act. The viscosity thickener must give sufficient viscosity to the removal formulation to thus meet the particular requirements at hand. For example, the removal of a coating from a vertical surface would dictate a removal formulation which possesses sufficient viscosity such that the formulation will not drain or "run" before the solvent has had a chance to strike through the coating layer. Also, the viscosity of the removal formulation oftentimes will be varied according to the technique or equipment which will be employed, e.g., brushing, rolling, spraying, and the like. The function of the evaporation retardant is indicated by its name. When a coating removal formulation is applied to the surface to be treated, evaporation of a minor portion of the active organic solvent generally will occur resulting in the formulation of a thin waxy coating over the remover composition. Evaporation retardants are also known in the art as film-forming compounds.

The present invention contemplates the preparation of a novel formulation useful for the removal of coatings and finishes such as paints, varnishes, lacquers, shellacs, gums, natural and synthetic resins, and the like, said formulation comprising (a) a major amount of an active organic solvent including organic solvent mixtures, (b) resinous poly(ethylene oxide) which is soluble and inert in said organic solvent or a mixture of organic solvents, and (c) an evaporation retardant. Mixtures of organic solvents which are miscible with each other, and in which resinous poly(ethylene oxide) is soluble in at least one of the miscible components comprising said organic mixture, also are contemplated. In addition, the novel formulation can include one or more conventional ingredients which are oftentimes employed to vary the characteristics of coating remover formulations such as, for example, wetting agent, e.g., sodium sulfate derivative of 3,9-diethyltridecan-6-ol; emulsifying agent, e.g., alkyl phenyl polyethylene glycol ether; activator, e.g., triethanolamine; water; penetrant, e.g., creosote; filler, e.g., ground wood, powdered calcium carbonate; and the like.

The resinous poly(ethylene oxides) contemplated as the viscosity thickening component in the novel surface coating removal formulations of this invention are firm, tough water-soluble polymers. These polymers appear to form homogeneous systems with water in all proportions. The resinous poly(ethylene oxides) show little change in melting point with increased molecular weight and the melting point, as measured by change in stiffness with temperature, is found to be about 66±2° C. throughout the range of reduced viscosities of from about 1.0 to about 25, and greater (as determined from a solution containing 0.2 gram of polymer in 100 milliliters of acetonitrile at 30° C.). The crystallization temperature of these polymers, as determined by measuring the break in the cooling curve, is about 55° C. Molecular weight determination of these resinous polymers via light scattering and sedimentation techniques indicate a molecular weight range of from approximately 100,000 to 1,000,000 and greater.

The active organic solvents contemplated in the novel coatings removal formulation include the normally-liquid organics in which resinous poly(ethylene oxide) is inert and soluble. In general, these organic solvents are relatively-volatile. Suitable active organic solvents in which resinous poly(ethylene oxide) is inert and soluble to varying degrees (at room temperature or elevated temperature, e.g. 100° C.), i.e., resinous poly(ethylene oxide) is inert and soluble in the active organic solvent at room temperature or elevated temperatures in an amount at least sufficient to function as the novel viscosity thickener component of the novel removal formulations, include, among others, aromatic hydrocarbons and chlorinated aromatic hydrocarbons, e.g., benzene, xylene, ethylbenzene, chlorobenzene, and the like; glycol diethers wherein each alkyl group contains less than three carbon atoms, e.g., the dimethyl and diethyl ethers of ethylene, propylene, and diethylene glycols, and the like; ethers containing at least one phenyl group and no other unsaturation, e.g., phenyl methyl ether, phenyl ethyl ether, diphenyl ether, and the like; dimethyldioxane; carbon tetrachloride; methylene chloride; ethylene dichloride; trichloroethylene; trimethylene dichloride; dimethylformamide; methanol, benzaldehyde; benzonitrile; butyl acetate; methyl ethyl ketone; acetonitrile; and the like. At a concentration of 1.0 weight percent, resinous poly(ethylene oxide) was essentially insoluble in such solvents as, for example, dimethylformamide, dioxane, and carbon tetrachloride; however, at about 50° to 100° C., the polymer dissolved in these solvents and no separation was apparent upon cooling the resulting solution to room temperature.

In addition, resinous poly(ethylene oxide) can be dissolved in binary, tertiary, etc., organic mixtures, one component of which is a non-solvent or a poor solvent for the poly(ethylene oxide). For instance, the solubility of poly(ethylene oxide) in organic vehicles such as xylene, 2-butoxyethanol, carbon tetrachloride, dimethylformamide, dioxane, and the like is limited at room temperature (though at elevated temperatures increasing solubility is manifest); however, a solution of methylene chloride containing 2.0 weight percent of poly(ethylene oxide), at room temperature, can tolerate up to 85 volume percent dilution with the preceding illustrated organic vehicles without precipitation of the poly(ethylene oxide) becoming manifest. By way of another illustration the solubilty of resinous poly(ethylene oxide) in benzene, at room temperature, is also limited; the addition of 2.0 volume percent, and greater, of methanol to benzene can increase the solubility of poly(ethylene oxide) in the resulting binary mixture several-fold. Methylene chloride is the preferred sole active organic solvent. Methylene chloride solutions containing a second component such as benzene, methanol, acetone, and the like, are preferred binary mixtures.

The evaporation retardants or film-forming compounds amenable as a component in the novel formulations of this invention include, among others, paraffin wax, montan or ceresin wax, crude scale wax, beeswax, vegetable wax, hydrocarbonaceous waxes obtained from petroleum crude treatment, and the like. Paraffin waxes are preferred.

For optimum results, the concentration of the components comprising the surface coating removal formulation will be governed by several considerations such as the active organic solvent and evaporation retardant of choice, the reduced viscosity of the resinous poly(ethylene oxide), the composition of the surface coating to be removed, the position of the surfaec coating, i.e., whether on an inclined or horizontal surface, and other factors. In general, the amount of evaporation retardant component contained in the formulation should be sufficient to substantially retard the evaporation of the active organic solvent after the removal formulation has been applied to the surface coating. The concentration of the resinous poly(ethylene oxide) component in the formulation should be sufficient to impart increased viscosity to said formulation and in this respect factors such as, for example, the means contemplated in applying the formulation to the surface coating, and the reduced viscosity, i.e., molecular weight, of the resinous poly(ethylene oxide) will play a role in determining the ultimate concentration of this ingredient. For example, lesser amounts of the higher molecular weight poly(ethylene oxides) will be needed than is the case with the relatively lower molecular weight poly(ethylene oxides). No simple rule of thumb is practical, and the optimum ratio for each combination of components comprising the surface coating removal formulation can be readily determined by routine experiment in view of the teachings set forth herein. Broadly, the surface coating removal formulation can comprise from about 90 to 100 parts by weight of active organic solvent, from about 0.01 to 10.0 parts by weight of resinous poly(ethylene oxide), and from about 0.1 to 5.0 parts by weight of evaporation retardant. It is preferred that the removal formulation comprise from about 95 to 100 parts by weight of active organic solvent, from about 0.1 to 5.0 parts by weight of resinous poly(ethylene oxide), and from about 0.2 to 2.0 parts by weight of evaporation retardant.

The particular manner of mixing the component to prepare the removal formulation is not narrowly critical. For example, the evaporation retardant and resinous poly(ethylene oxide) can be added to the active organic solvent, at room temperature or at elevated temperatures, and agitated until solution occurs.

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, filed May 29, 1956, and assigned to the same assignee as the instant application. The reduced viscosities of poly(ethylene oxide) referred to in the above-said application are measured in acetonitrile at a concentration of 0.2 grams of polymer per 100 milliliters of solvent at 30° C.; the reduced viscosities of the other alkylene oxide polymers are more conveniently measured in benzene. The above-mentioned application teaches the preparation of poly(alkylene oxide), e.g., poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of nonsorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, and mixtures thereof. The polymerization reaction is preferably conducted at a temperature in the rangs from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methyl-cyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely-divided solid particle form resembling in particle size finely-divided sand. For further information regarding the production of granular poly(ethylene oxide) reference is hereby made to the disclosure of application Serial No. 587,955.

Lower olefin oxides such as ethylene oxide, propylene oxide, butylene oxide, and the like, can also be polymerized, in the presence of certain divalent metal amide-alcoholate catalysts, to solid polymers having a reduced viscosity of at least 1.0. This polymerization process is subject matter of application Serial No. 674,308, entitled "Epoxide Polymerization and Compounds Therefor," by F. N. Hill, J. T. Fitzpatrick, and F. E. Bailey, Jr., filed July 26, 1957, and assigned to the same assignee as the instant application. The particular class of catalysts employed in the polymerization process of the above-said application is the metal amide-alcoholates wherein the metal radical is a divalent metal with an atomic number greater than 4 and less than 57 from Group II of the Periodic Table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as $-30°$ C. and as high as $+150°$ C. In a preferred embodiment, ethylene oxide can be polymerized in the presence of an inert liquid organic medium in which the monomer is soluble and the resulting polymer is insoluble. Agitation of the reaction mixture and controlling the temperature between about $-30°$ C. to about $+70°$ C. results in the production of poly(ethylene oxide) in granular form. For further information regarding this polymerization route reference is hereby made to the disclosure of the above-identified application Serial No. 674,308.

In addition, ethylene oxide polymers which have been molecularly degraded to a reduced viscosity above about 1.0 by the reaction with a halogenating agent such as an alkali metal hypochlorite or alkaline earth metal hypochlorite can be employed in the instant invention with suitable results. The molecular degradation of poly(ethylene oxide) via treatment with a halogen or halogen-liberating compound is the subject matter of application Serial No. 668,306, entitled "Halogen Modified Poly(Alkylene Oxide) Resins," by K. L. Smith et al., filed June 27, 1957, and assigned to the same assignee as the instant application. Ethylene oxide polymers having a reduced viscosity above about 1.0 which have been subjected to reduced viscosity loss, i.e., decrease in molecular weight, via treatment with a peroxide compound, notably peracetic acid, are likewise suitable and conveniently employed in the instant invention. The peroxide compound degradation treatment is the subject matter of application Serial No. 668,547, entitled "Alkylene Oxide Polymers," by K. L. Smith and E. C. Seltzer, filed June 27, 1957, and assigned to the same assignee as the instant application.

The instant invention also contemplates the use of poly(ethylene oxide) having an antioxidant incorporated therein such as those disclosed in application Serial No. 587,953, entitled "Chemical Process and Product," by F. N. Hill, filed May 29, 1956, and assigned to the same assignee as the instant application. Among the antioxidants disclosed in the above-mentioned application include the use of diamine derivatives such as N,N-di(2-hydroxypropyl)-di-(2-hydroxyethyl)ethylenediamine, N,N,N'-tri(2-hydroxypropyl)-N'-(2-hydroxyethyl)ethylenediamine, N,N,N',N'-tetrakis(2-hydroxypropyl)ethylenediamine, and others. The antioxidants can be employed at a concentration in the range from about 0.5 to 5.0 weight percent, and higher, based on the polymer weight.

In the following illustrative examples, the evaporation retardant employed was a paraffin wax known as Pennzoil White Scale having a melting range of about 124°–126° F.

EXAMPLE 1

The following systems were prepared by dissolving paraffin wax in methylene chloride and subsequently adding resinous poly(ethylene oxide) [1] directly thereto, with stirring, until solution was complete. The pertinent data is set forth in Table I below.

*Table I*

| Solution number | Methylene chloride, cc. | Poly(ethylene oxide), gm. | Paraffin wax, gm. |
|---|---|---|---|
| 1 | 50 | 1 | 0.5 |
| 2 | 50 | 1 | 0.25 |
| Control | 50 | 1 | 0.0 |

The above solutions when brushed on a glass plate in an average thickness of 1/32 inch and placed in a vertical position exhibited the following properties: Number 1 sagged very slightly during an 18-hour test period; Number 2 did not sag; the control sagged badly and dried in less than one minute.

It should be noted at this point that methyl cellulose will not dissolve in solely methylene chloride. Generally, the methylene chloride is diluted with roughly 10 percent methanol before becoming a solvent for methyl cellulose.

EXAMPLE 2

The following systems were prepared. To paraffin wax, melted at 60°–70° C., there was added methylene chloride, followed by methanol, and lastly, resinous poly(ethylene oxide),[2] with stirring, until a homogeneous mixture was observed. The pertinent data is set forth in Table II below.

*Table II*

| Solution number | Methylene chloride [a] | Methanol [a] | Poly (ethylene oxide) [b] | Paraffin wax [a] |
|---|---|---|---|---|
| 1 | 92.4 | 6.1 | 0.05 | 1.5 |
| 2 | 92.4 | 6.1 | 0.10 | 1.5 |
| 3 | 92.4 | 6.1 | 0.20 | 1.5 |
| 4 | 92.4 | 6.1 | 0.30 | 1.5 |

[a] Percent by weight of component in question, based on total weight of $CH_2Cl_2$, $CH_3OH$ and wax.
[b] Percent by weight per 100 cc. of combined $CH_2Cl_2$, $CH_3OH$, and wax mixture having the proportions indicated in each horizontal row.

All four solutions when brushed on a nitrocellulose lacquer (approximately 3–4 mils thick) dissolved this lacquer in less than 15 minutes. The dissolved lacquer was readily scrapable with a putty knife. The four solutions were laid down by brush, the wet-film being approximately 1/16 inch thick. Solution numbers 2 and 3 spread well and did not sag on a vertical surface. The four solutions were clear, and free from the grain that prevails with methyl cellulose as a viscosity thickener.

EXAMPLE 3

The following systems were prepared by first dissolving the paraffin wax in a small portion of methylene chloride heated to 35° C. The remaining methylene chloride subsequently was added, and finally resinous poly(ethylene oxide) [3] was slowly incorporated therein, under stirring, until solution was complete. The pertinent data are shown in Table III below.

*Table III*

| Solution number | Methylene chloride, cc. | Poly (ethylene oxide), percent [a] | Paraffin wax, percent [a] |
|---|---|---|---|
| 1 | 50 | 1.5 | 0.4 |
| 2 | 50 | 1.5 | 0.8 |
| 3 | 50 | 1.5 | 1.2 |

[a] Weight percent of component in question per 50 cc. of methylene chloride.

---

[1] Reduced viscosity value of 6.5; measured at a concentration of 0.2 gram of said poly(ethylene oxide) in 100 milliliters of acetonitrile at 30° C.

[2] Reduced viscosity value of 63; measured at a concentration of 0.2 gram of said poly(ethylene oxide) in 100 milliliters of acetonitrile at 30° C.

[3] See Example 1, footnote 1.

When spread upon glass as a 1/64 inch layer, all solutions remained wet for over four hours which period of time is generally sufficient for paint removing operations.

EXAMPLE 4

The following systems were prepared in a manner similar to that of Example 3. The apropos data is disclosed in Table IV below.

*Table IV*

| Solution number | Methylene chloride, cc. | Poly(ethylene oxide), percent [a] | Paraffin wax, percent [a] |
|---|---|---|---|
| 1 | 50 | 4 | 0.5 |
| 2 | 50 | 4 | 0.5 |
| Control | 50 | 4 | 0.0 |

[a] Weight percent of component in question per 50 cc. of methylene chloride. The poly(ethylene oxide) was the same as that employed in Example 3.

Solutions 1 and 2 did not sag in 18 hours after spreading on glass as a 1/64 inch film. The control film dried in one minute and hence did not have time to sag.

All solutions when brushed on a vertical surface remained wet for over four hours, and were effective removers.

EXAMPLE 6

The following systems were prepared in a manner similar to that of Example 3. The composition of the formulations are shown in Table VI below.

*Table VI*

| Solution number | Methylene chloride, cc. | Poly(ethylene oxide), percent [a] | Paraffin wax, percent [a] |
|---|---|---|---|
| 1 | 50 | 4 | 0.5 |
| 2 | 50 | 4 | 3.0 |

[a] Weight percent of component in question per 50 cc. of methylene chloride. The poly(ethylene oxide) was the same as that employed in Example 3.

Solutions 1 and 2 of Table VI were brushed (one-inch brush) on various sections of different horizontal coated surfaces and their effectiveness as removal formulations were observed and compared to the U.S.A.F. formulation which was similarly brushed (one-inch brush) on another section of these coated surfaces. The pertinent data and results are shown in Table VI(A) below.

*Table VI(A)*

| No. | Coated Surface | Solution 1 | Solution 2 | U.S.A.F. |
|---|---|---|---|---|
| A | "Vinylite" VAGH orange pigment | Scrapable, 2 min | Scrapable, 2 min | Scrapable, 2 min. |
| B | "Vinylite" VAGH [1] aluminum pigment | do | do | Scrapable, 4 min. |
| C | "Vinylite" VYHH [2] XE-565 | do | do | Scrapable, 6 min. |
| D | Organosol finish vinyl-phenolic primer.[3] | do | do | Scrapable, 2 min. |
| E | Lucite,[4] modified, air-dried | do | do | Do. |
| F | Alkyd-urea formaldehyde, F-1210 | Film lifted completely in 1 minute | | Lifted, 2 min. |
| G | Epoxy resin Epon 1001 [5] | Scrapable, 6 min | Scrapable, 6 min | Lifted, 6 min. |
| H | Alkyd-Melamine 245-8 [6] | Film lifted completely in 1 minute | | Lifted, 2 min. |

[1] A powdered aluminum pigmented polymer comprising vinyl chloride (91 wt. percent), vinyl acetate (3 wt. percent) and vinyl alcohol (calc. at 6 wt. percent).
[2] A polymer comprising vinyl chloride (87 wt. percent) and vinyl acetate (13 wt. percent).
[3] The organosol is a polymer comprising vinyl chloride (>96 wt. percent) and vinyl acetate (<4 wt. percent) suspended in a solution of 20 parts diisobutyl ketone and 80 parts of xylene. The vinylphenolic primer comprises a "Vinylite" VMCH (vinyl chloride, 83 wt. percent; vinyl acetate, 13 wt. percent; maleic anhydride, 1 wt. percent) mixed with Bakelite phenolic resin (BKR-2620) prepared by reacting 80 parts by wt. of phenol, 20 parts by wt. of ortho-cresol, 61.6 parts by wt. of formalin, and 2.4 parts by wt. hexamethylenetetramine.
[4] E. I. du Pont de Nemours Co. trademark for polymethylmethacrylate.
[5] Shell Chemical Co. trademark for polymeric diglycidyl diether of bis(4-hydroxyphenyl)-2,2-propane which has an epoxy equivalent weight range of from 450–525.
[6] Alkylated melamine-formaldehyde resin.

EXAMPLE 5

The following systems were prepared as set forth in Example 3 supra. The composition of the formulations are shown in Table V below.

*Table V*

| Solution number | Methylene chloride, cc. | Poly(ethylene oxide), percent [a] | Methanol, percent [a] | Paraffin wax, percent [a] |
|---|---|---|---|---|
| 1 | 87.2 | 3.5 | 8.8 | 0.4 |
| 2 | 86.9 | 3.5 | 8.7 | 0.9 |
| 3 | 86.2 | 3.5 | 8.6 | 1.7 |
| 4 | 85.4 | 3.5 | 8.5 | 2.6 |

[a] Weight percent of component in question per volume of methylene chloride as indicated. The poly(ethylene oxide) was the same as that employed in Example 3.

The components comprising the U.S.A.F. formulation are set forth in Table VI(B) below.

*Table VI(B)*

| Component: | Percent by weight |
|---|---|
| Methylene chloride | 72.0 |
| Methanol | 6.0 |
| Monoethylamine | 5.0 |
| Ethylene glycol monoethyl ether | 4.0 |
| Nacconal NR[a] flake | 5.0 |
| Methyl cellulose (med.vis.) | 2.0 |
| Paraffin wax | 3.0 |
| Water | 3.0 |

[a] Allied Chemical and Dye Corp. trademark for sodium alkyl aryl sulfonate.

It is readily apparent from the results shown in Table VI(A) that the removal ability of solutions 1 and 2 are at least as effective as the U.S.A.F. specification formulation.

EXAMPLE 7

The following systems were prepared. To a paraffin wax benzene solution maintained at 35°–40° C., there was added resinous poly(ethylene oxide) [4], followed by the addition of methanol thereto. Complete solution was effected by stirring. The pertinent data is as follows:

Table VII

| Solution number | Benzene, cc. | Methanol, cc. | Poly (ethylene oxide), gm. | Paraffin Wax, gm. |
|---|---|---|---|---|
| 1 | 50 | 50 | 2.0 | 0.5 |
| 2 | 75 | 50 | 2.0 | 1.0 |
| 3 | 50 | 50 | 2.0 | 1.0 |

These solutions subsequently were spread on glass as a thin film. After four hours the films were still wet. The sag properties of these solutions on a vertical surface were satisfactory. A preparation lacking the paraffin wax ingredient evaporated to dryness in a few minutes when similarly spread on the glass surface as a thin film.

Actual measurements of evaporation loss were made on solutions 1, 2 and 3 above. A five-gram quantity of each solution was placed in metal cans. These were 1.5 inches in diameter by 0.5 inch in depth. The surface area for evaporation was 3.0 square inches. After standing for 20 hours at room temperature the following was observed: Solution 1 had a solvent loss of about 9 weight percent; solution 2 had a solvent loss of about 20 weight percent; and solution 3 had a solvent loss of about 9 weight percent.

EXAMPLE 8

The following formulations were prepared as follows: Methylene chloride was added to melted paraffin wax (at 70° C.), followed by the addition thereto of resinous poly(ethylene oxide), with stirring, until solution was complete. Acetone or benzene was then added to the resulting solution. The apropos data are set forth in Table VIII below.

Table VIII

| Solution Number | Methylene chloride, cc. | Acetone, cc. | Benzene, cc. | Poly (ethylene oxide), gm. | Paraffin wax, gm. |
|---|---|---|---|---|---|
| 1 | 50 | 33 | | 1.0 | 0.25 |
| 2 | 50 | | 33 | 1.0 | 0.25 |

Both solutions remained wet over a period of several hours when brushed on a glass surface. The sag properties of these two solutions were good.

Although the invention has been illustrated by the preceding examples, the invention is not to be construed as limited to the materials employed in the above-said exemplary examples, but rather, the invention encompasses the generic invention as hereinbefore disclosed. Various modifications and embodiments of this invention can be made without departing from the spirit and scope thereof.

---

[4] Reduced viscosity value of 3.5; measured at a concentration of 0.2 gram of said poly(ethylene oxide) in 100 milliliters of acetonitrile at 30° C. This polymer is also employed in Example 8.

What is claimed is:

1. A surface coating remover formulation which comprises (a) an active organic solvent adapted to loosen a surface coating preparatory to removal thereof; (b) from about 0.01 to 10.0 parts by weight of poly(ethylene oxide) per 90 to 100 parts by weight of said organic solvent, said poly(ethylene oxide) being soluble in and inert to said organic solvent, and said poly(ethylene oxide) being a firm, tough, resinous polymer which forms homogeneous systems with water in all proportions and having a melting point of about 66±2° C. and a crystallization temperature determined from the break in its cooling curve of about 55° C.; and (c) an evaporation retardant in an amount sufficient to substantially retard the evaporation of said organic solvent, said evaporation retardant being soluble in and inert to said organic solvent.

2. The surface coating remover formulation of claim 1 wherein said evaporation retardant is a paraffinic wax.

3. The surface coating remover formulation of claim 2 wherein said active organic solvent is methylene chloride.

4. A surface coating remover formulation which comprises (a) from about 90 to 100 parts by weight of an active organic solvent adapted to loosen a surface coating preparatory to removal thereof; (b) from about 0.01 to 10.0 parts by weight of poly(ethylene oxide) which is soluble in and inert to said organic solvent, said poly(ethylene oxide) being a firm, tough, resinous polymer which forms homogeneous systems with water in all proportions and having a melting point of about 66±2° C. and a crystallization temperature determined from the break in its cooling curve of about 55° C.; and (c) from about 0.1 to 5.0 parts by weight of paraffin wax which is soluble in and inert to said organic solvent.

5. The surface coating remover formulation of claim 4 wherein said active organic solvent is methylene chloride.

6. A surface coating remover formulation which comprises (a) from about 95 to 100 parts by weight of methylene chloride; (b) from about 0.1 to 5.0 parts by weight of a firm, tough resinous poly(ethylene oxide) polymer which forms homogeneous systems with water in all proportions and having a melting point of about 66±2° C., and a crystallization temperature determined from the break in the cooling curve of about 55° C.; and (c) from about 0.2 to 2.0 parts by weight of paraffin wax.

References Cited by the Examiner

UNITED STATES PATENTS

| 1,930,853 | 10/33 | Kollek et al. | 106—10 |
| 2,495,729 | 1/50 | Hutson et al. | 134—38 |

FOREIGN PATENTS 774,807  5/57  Great Britain.

OTHER REFERENCES

Staudinger et al.: "Justus Liebig's Annalem Der Chemie," vol. 505, 1933, pp. 41–51.

MORRIS LIEBMAN, *Primary Examiner.*

DANIEL ARNOLD, ALPHONSO D. SULLIVAN, MILTON STERMAN, *Examiners.*